United States Patent
Hunter et al.

(10) Patent No.: US 11,333,537 B2
(45) Date of Patent: May 17, 2022

(54) LOAD LEVELING BOOST SUPPLY FOR MAGNETIC FLOWMETER

(71) Applicant: Micro Motion, Inc., Boulder, CO (US)

(72) Inventors: Kirk Allan Hunter, Eden Prairie, MN (US); Jared James Dreier, Chaska, MN (US)

(73) Assignee: MICRO MOTION, INC., Boulder, CO (US)

( * ) Notice: Subject to any disclaimer, the term of this patent is extended or adjusted under 35 U.S.C. 154(b) by 193 days.

(21) Appl. No.: 16/727,357

(22) Filed: Dec. 26, 2019

(65) Prior Publication Data

US 2021/0072055 A1   Mar. 11, 2021

Related U.S. Application Data

(60) Provisional application No. 62/896,130, filed on Sep. 5, 2019.

(51) Int. Cl.
| | | |
|---|---|---|
| *G01F 1/58* | (2006.01) | |
| *G01F 1/60* | (2006.01) | |
| *H02J 7/00* | (2006.01) | |

(52) U.S. Cl.
CPC ............. *G01F 1/586* (2013.01); *G01F 1/60* (2013.01); *H02J 7/0068* (2013.01)

(58) Field of Classification Search
None
See application file for complete search history.

(56) References Cited

U.S. PATENT DOCUMENTS

| | | | |
|---|---|---|---|
| 4,167,871 A | | 9/1979 | Shauger et al. |
| 4,193,298 A | | 3/1980 | Kayama et al. |
| 4,229,703 A | | 10/1980 | Bustin |
| 4,563,904 A | * | 1/1986 | Geisler ............... G01F 1/60 361/152 |
| 4,784,000 A | | 11/1988 | Gaertner |
| 4,916,381 A | * | 4/1990 | Gelecinskyj ............ G01F 1/60 323/285 |

(Continued)

FOREIGN PATENT DOCUMENTS

| | | |
|---|---|---|
| CA | 2 306 666 | 3/1991 |
| CN | 1170125 | 10/2004 |

(Continued)

OTHER PUBLICATIONS

Office Action from Chinese Patent Application No. 202020151175.3, dated Jul. 7, 2020.

(Continued)

*Primary Examiner* — Harshad R Patel
(74) *Attorney, Agent, or Firm* — Westman, Champlin & Koehler, P.A.

(57) ABSTRACT

A magnetic flowmeter for measuring a fluid flow includes a flow tube assembly receiving the flow and having a coil with first and second coil wires for receiving a coil current and responsively producing a magnetic field thereby generating an EMF in the fluid representative of a flow rate. An EMF sensor is arranged to sense the EMF and generate an output indicating the flow rate. Current supply circuitry applies a current supply signal to the coil. A load leveling boost supply provides power to the current supply circuitry. In another aspect, power scavenging circuitry recovers power from the coil.

14 Claims, 4 Drawing Sheets

(56) References Cited

U.S. PATENT DOCUMENTS

| | | | |
|---|---|---|---|
| 5,325,728 A | | 7/1994 | Zimmerman et al. |
| 5,372,045 A | * | 12/1994 | Schulz .................. G01F 1/58 363/17 |
| 5,530,639 A | | 6/1996 | Schulz et al. |
| 5,639,970 A | | 6/1997 | Schulz |
| 5,874,818 A | | 2/1999 | Schuurman |
| 5,905,206 A | | 5/1999 | Herwig et al. |
| 6,269,701 B1 | | 8/2001 | Keech |
| 6,505,517 B1 | * | 1/2003 | Eryurek .................. G01F 1/60 702/189 |
| 6,644,127 B1 | | 11/2003 | Matzen |
| 6,697,742 B1 | | 2/2004 | Franklin et al. |
| 6,763,729 B1 | | 7/2004 | Matzen |
| 7,688,057 B2 | | 3/2010 | Foss et al. |
| 7,779,702 B2 | | 8/2010 | Shanahan |
| 7,921,733 B2 | | 4/2011 | Foss et al. |
| 8,590,361 B1 | * | 11/2013 | Feller .................. G01F 1/60 73/1.34 |
| 9,163,968 B2 | | 10/2015 | Foss et al. |
| 9,175,993 B2 | | 11/2015 | Hunter et al. |
| 9,182,258 B2 | | 11/2015 | Rovner |
| 9,228,869 B2 | | 1/2016 | Hunter et al. |
| 9,395,221 B2 | | 7/2016 | Foss et al. |
| 9,696,188 B2 | | 7/2017 | Rogers et al. |
| 9,952,075 B2 | | 4/2018 | Foss et al. |
| 10,075,246 B2 | | 9/2018 | Hunter et al. |
| 10,663,331 B2 | | 5/2020 | Foss et al. |
| 2006/0081067 A1 | | 4/2006 | Budmiger |
| 2010/0107776 A1 | | 5/2010 | Shanahan |
| 2013/0333484 A1 | | 12/2013 | Henry et al. |
| 2015/0082906 A1 | | 3/2015 | Foss et al. |
| 2015/0082909 A1 | | 3/2015 | Foss et al. |
| 2015/0177035 A1 | | 6/2015 | Rovner et al. |
| 2017/0115146 A1 | | 4/2017 | Shi |

FOREIGN PATENT DOCUMENTS

| | | |
|---|---|---|
| CN | 107478279 | 12/2017 |
| CN | 107560676 | 1/2018 |
| DE | 10 2004 046 238 | 3/2006 |
| EP | 1 260 797 | 11/2002 |
| EP | 2 167 922 | 4/2019 |
| FR | 2 521 289 | 8/1983 |
| GB | 2 348 964 | 4/2000 |
| JP | 3-122523 | 5/1991 |
| RU | 2 584 384 | 5/2016 |
| RU | 2 645 834 | 2/2018 |
| WO | WO 2009/008974 | 1/2009 |
| WO | WO 2009/154112 | 12/2009 |
| WO | WO 2018/215034 | 11/2018 |

OTHER PUBLICATIONS

International Search Report and Written Opinion of the International Searching Authority from International Application No. PCT/US2020/024656, dated Jul. 8, 2020.

International Search Report and Written Opinion of the International Searching Authority from International Application No. PCT/US2020/047775, dated Nov. 19, 2020.

International Search Report and Written Opinion of the International Searching Authority from International Application No. PCT/US2020/047432, dated Nov. 25, 2020.

International Search Report and Written Opinion of the International Searching Authority from International Application No. PCT/US2020/047609, dated Dec. 16, 2020.

Office Action from U.S. Appl. No. 16/587,615, dated May 5, 2021.
Office Action from U.S. Appl. No. 16/587,886, dated May 14, 2021.
Office Action from U.S. Appl. No. 16/588,012, dated May 28, 2021.
Communication pursuant to Rules 161(1) and 162 EPC from European Patent Application No. 20720243.3, dated Feb. 25, 2022.

\* cited by examiner

LOAD LEVELING BOOST SUPPLY FOR MAGNETIC FLOWMETER

CROSS-REFERENCE TO RELATED APPLICATION

The present application is based on and claims the benefit of U.S. provisional patent application Ser. No. 62/896,130, filed Sep. 5, 2019, the content of which is hereby incorporated by reference in its entirety.

BACKGROUND

Embodiments of the present disclosure relate to magnetic flowmeters and, more specifically, to techniques for controlling the current used to generate a magnetic field used in flow rate measurements.

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional magnetic flowmeters include a sensor (or pipe) section and a transmitter section. The transmitter section includes a coil driver that drives a current through a coil of the sensor section to generate a magnetic field across the pipe section. The magnetic field induces the EMF or potential difference (voltage) across the flow that is proportional to the velocity of the flow. The magnetic flowmeter measures the flow rate based on the voltage difference, which is detected by the sensor section.

Magnetic flowmeters must work with large inductive switching loads. These inductive loads cause large swings in current through the load. This creates extreme challenges on the internal power supplies. If the dynamic loads are not managed properly, they can cause input current surges to the transmitter which produce potential supply challenges for the power systems use to power the magnetic flowmeter.

The accuracy of the flow rate measurement depends on many factors, one of which is the accurate generation of the magnetic field across the flow. An operating setpoint directs the coil driver to generate the current that will produce a desired magnetic field across the flow. The current may be periodically sampled to ensure that it matches the operating setpoint.

SUMMARY

A magnetic flowmeter for measuring a fluid flow includes a flow tube assembly receiving the flow and having a coil with first and second coil wires for receiving a coil current and responsively producing a magnetic field thereby generating an EMF in the fluid representative of a flow rate. An EMF sensor is arranged to sense the EMF and generate an output indicating the flow rate. Current supply circuitry applies a current supply signal to the coil. A load leveling boost supply provides power to the current supply circuitry. In another aspect, power scavenging circuitry recovers power from the coil.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
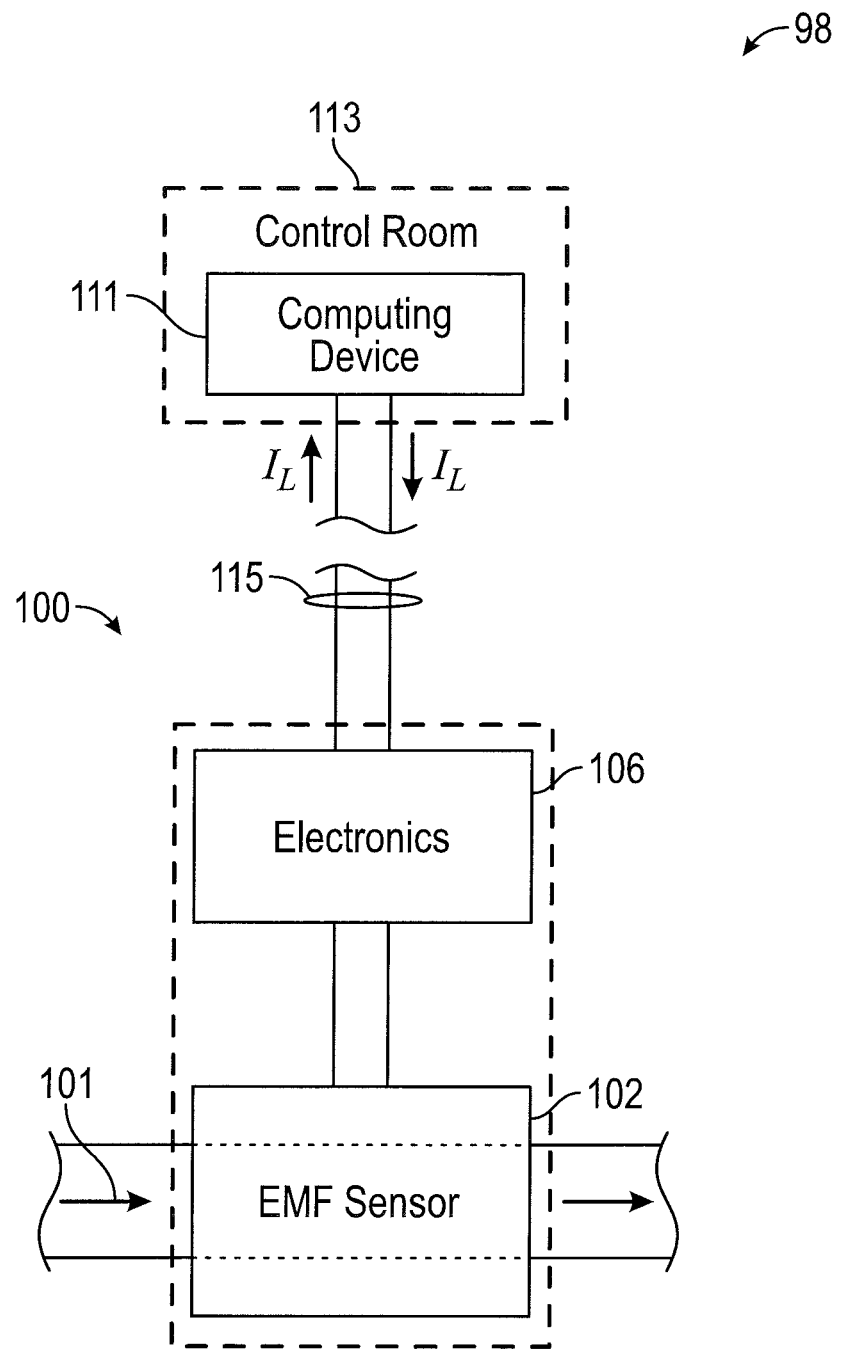
FIG. 1 is a simplified diagram of an exemplary industrial process measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

Magnetic flowmeters utilize a current through the sensor (coil) to develop a magnetic field, and as a conductive fluid passes through this field, an electric field that is proportional to the flow rate is produced, in accordance to Faradays' Law. To cancel out offsets in the system, the current is reversed periodically (known as the Coil Frequency) and, in the simplest case, an average voltage is obtained to determine the flow rate. During the current reversal, a back-emf is generated that is proportional to the current and the inductance of the coil in the flow sensor. This back-emf causes the regulated power supply that powers the sensor to momentarily lose the ability to regulate the output voltage. As the magnitude of the back-emf increases, it can actually cause the power supply to turn off. When this happens, the power supply must very quickly turn back on and deliver a large current to keep the system regulated and to complete the current reversal. The current surges on the power supply system can be extreme and are not well supported by typical power systems. The present invention includes techniques and circuits that regulate the current to a constant value. In one aspect, the invention integrates load leveling circuitry into a boost supply to remove/reduce dynamic current surges. Additionally, the circuitry captures the counter EMF energy stored in the inductive load and reuses this energy on the next switching cycle.

In one aspect, the invention includes a magnetic flowmeter which includes a load leveling boost power supply circuit. In another aspect, the invention includes a scavenging circuit which is configured to reuse the back EMF which is generated in a flow tube coil following a current reversal cycle.

FIG. 1 is a simplified diagram of an exemplary industrial process measurement system 98, in accordance with embodiments of the present disclosure. The system 98 may be used in the processing of a material (e.g., process medium) to transform the material from a less valuable state into more valuable and useful products, such as petroleum, chemicals, paper, food, etc. For example, the system 98 may be used in an oil refinery that performs industrial processes that can process crude oil into gasoline, fuel oil, and other petrochemicals.

The system 98 includes a pulsed direct current (DC) magnetic flowmeter 100 that is configured to sense a flow rate of a process fluid flow 101, such as through a pipe or flow tube 102, for example. The magnetic flowmeter 100 includes an electromotive force (EMF) sensor (107 in FIG. 2) and flowmeter electronics (transmitter) 106. The sensor is generally configured to measure or sense the flow rate of the fluid flow 101. The electronics 106 are generally configured to control the applied magnetic field to measure the flow rate, and optionally communicate the measured flow rate to an external computing device 111, such as a computerized control unit, which may be remotely located from the flowmeter 100, such as in a control room 113 of the system 98.

The electronics 106 may communicate with the external computing device 111 over a suitable process control loop. In some embodiments, the process control loop includes a physical communication link, such as a two-wire control loop 115, or a wireless communication link. Communications between the external computing device 111 and the flowmeter 100 may be performed over the control loop 115 in accordance with conventional analog and/or digital communication protocols. In some embodiments, the two-wire control loop 115 includes a 4-20 milliamp control loop, in which a process variable may be represented by a level of a loop current $I_L$ flowing through the two-wire control loop 115. Exemplary digital communication protocols include the modulation of digital signals onto the analog current level of the two-wire control loop 115, such as in accordance with the HART® communication standard. Other purely digital techniques may also be employed including FieldBus and Profibus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 100 from any suitable power source. For example, the magnetic flowmeter 100 may be wholly powered by the loop current $I_L$ flowing through the control loop 115. One or more power supplies may also be utilized to power the process magnetic flowmeter 100, such as an internal or an external battery. An electrical power generator (e.g., solar panel, a wind power generator, etc.) may also be used to power the magnetic flowmeter 100, or charge a power supply used by the magnetic flowmeter 100. However, most flowmeters typically operate in what is known as a "four-wire" configuration in which two wires are used to provide the process control loop 115 and a second pair of wires are used to provide power to the flowmeter. The power can be provided by a local DC power source and is useful in providing the relatively large amount of power required to generate a strong magnetic field in the flow of process fluid.

Figure 2:
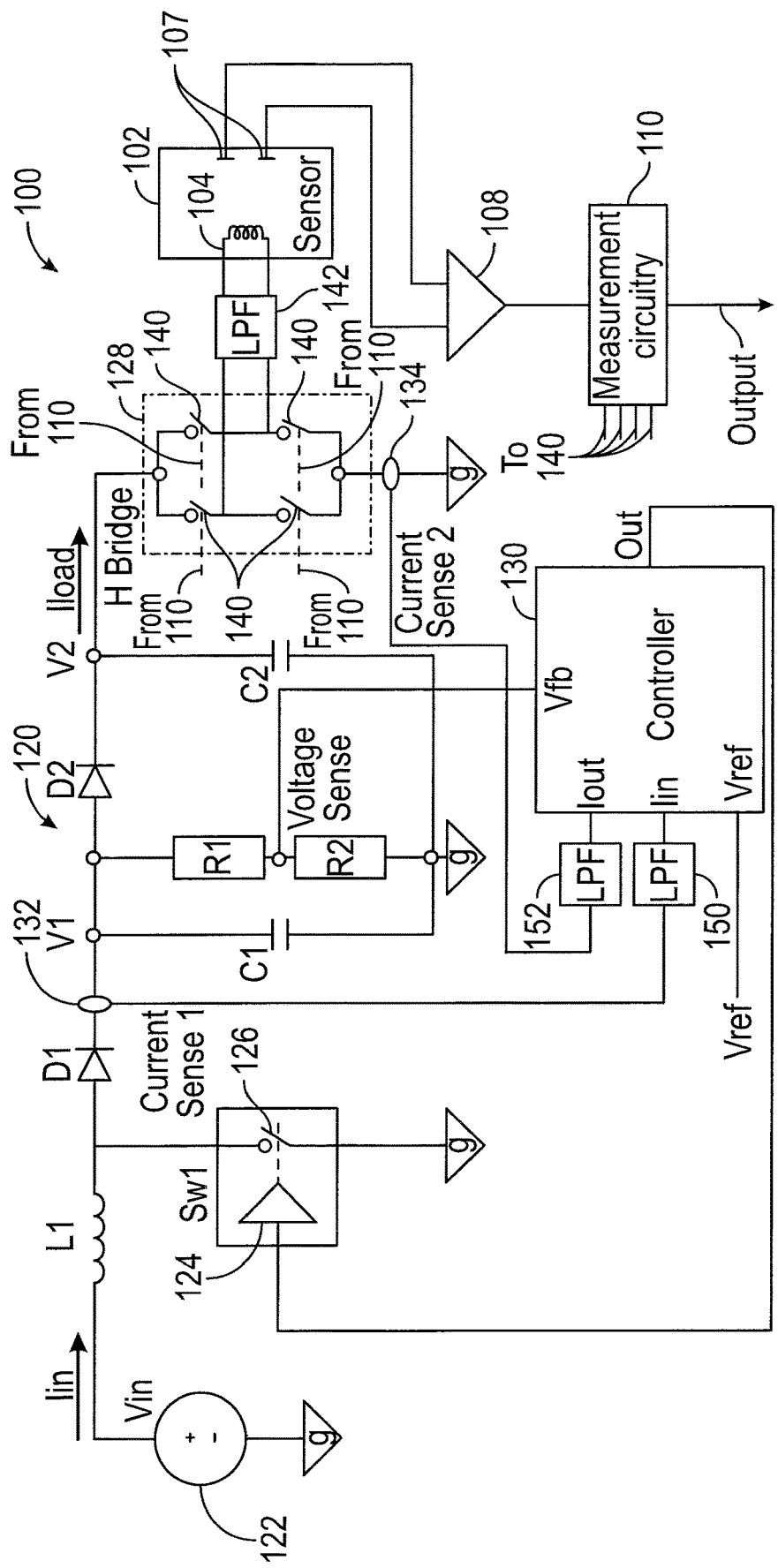
FIG. 2 is a simplified circuit diagram of a magnetic flowmeter.

FIG. 2 is a simplified block diagram of magnetic flowmeter 100. Magnetic flowmeter 100 includes flow tube 102 configured to receive a flow of process fluid therethrough. A coil 104 is positioned in the flow tube 102 and is configured to apply a magnetic field for the moving process fluid. Electrodes 107 are carried in the flow tube 102 and are exposed to the process fluid. These electrodes 107 sense an EMF generated in response to the magnetic field applied to the moving process fluid. As discussed above, this EMF is proportional to the flow rate of the process fluid.

In the configuration illustrated in FIG. 2, a differential amplifier 108 is configured to sense and amplify the voltage difference generated between the two electrodes 107. In one configuration, the differential amplifier 108 includes an analog to digital converter which provides a digital output related to the sensed EMF. In either case, the output from element 108 is related to the sensed EMF which in turn is proportional to the flow rate of the process fluid.

Measurement circuitry 110 receives the output from differential amplifier 108 and provides an output related to the flow of the process fluid. The measurement circuitry 110 can be implemented in digital and/or analog circuitry and can include a microprocessor or the like. In one configuration, the output from measurement circuitry 110 is of the type used in a process control environment. For example, as discussed above, the output can comprise an output on a two-wire process control loop including, for example, a 4-20 mA process control loop. The control loop may operate in accordance with the HART® communication protocol, a Fieldbus protocol, or other hardwired protocol. Further, the process control loop can also comprise a wireless control loop in which signals are communicated wirelessly. In some configurations, the same process control loop is used to provide power to the magnetic flowmeter 100.

The current applied to the coil 104 of the magnetic flow tube 102 is controlled by Load-leveling Boost Supply 120. As discussed herein, Load-leveling Boost Supply 120 operates as a load leveling boost supply.

The Load-leveling Boost Supply 120 includes a power source 122 which provides an input voltage $V_{In}$ and an input current $I_{IN}$ which is applied to an inductor L1. The output of inductor L1 can be selectively shorted to electrical ground using switch SW1 which is formed by a gate driver 124 and a transistor switch 126. Power source 122 can be loaded internally or externally to the device. The circuitry can reduce or eliminate current surges drawn from a power source 122. Inductor L1, diode D1, capacitor C1 along with switch SW1 operate to provide a boost power supply configuration in which a DC input voltage $V_{IN}$ is boosted to a higher voltage V1. The transient current through the inductor causes the voltage to increase beyond that provided by the power supply 122. Capacitor C1 operates to smooth voltage spikes. The voltage V1 is connected to an H-bridge driver 128 through diode D2. Diodes D1 and D2 are connected to electrical ground through capacitors C1 and C2 respectively. Further, a controller 130 is configured to sense a feedback voltage $V_{FB}$ using resistors R1 and R2. The H-bridge driver 128 includes switches 140 which are controlled by measurement circuitry 110 in accordance with known techniques. More specifically, by alternating operation of switches on either side of the H-bridge 128, the direction of the current applied to the coil 104 through a low pass filter 142 can be switched.

Figure 3:
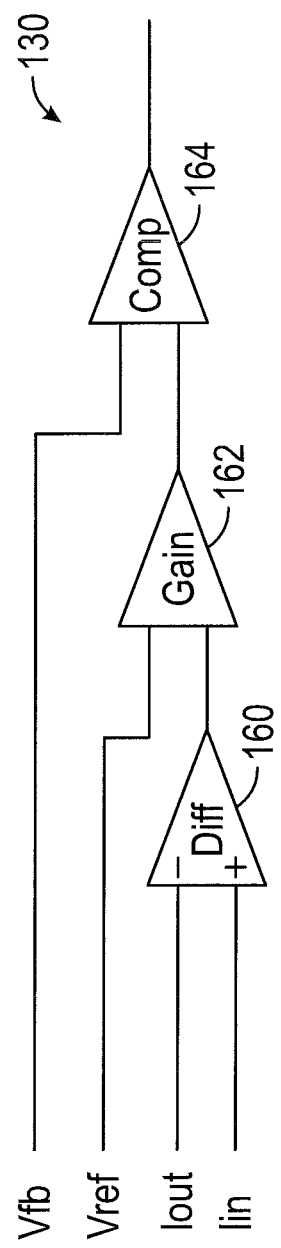
FIG. 3 is a circuit diagram of a power controller of FIG. 1.

The controller 130 is configured to sense a current ($I_{In}$) applied to the H-bridge using a current sensor 132 through a low pass filter 150 as well as the current output of the H-bridge ($I_{Out}$) using current sensor 134 through low pass filter 152. One example configuration of the controller 130 is shown in FIG. 3 which includes amplifiers 160, 162 and 164. Differential amplifier 160 provides an output related to a difference between the input and output currents. Amplifier 162 amplifies this current difference based upon a voltage reference $V_{ref}$. The amplified output from amplifier 162 is then compared to the feedback voltage $V_{fb}$ and a control output is applied to switch SW1.

During operation, the Load-leveling Boost Supply 120 operates in a boost switching power supply configuration that takes an input voltage $V_{IN}$, and steps it up (boosts it) to a higher output voltage V1 or V2. In order to level the input current $I_{IN}$, the net output current $I_{OUT}$ must be determined. For the majority of the cycle, current is flowing out of the boost circuit. However, during the back-emf time when the direction of current through coil 104 is reversed, the current flows back into the boost circuit. The actual boost load current is the time-averaged sum of these two currents (the net load current). The low pass filter 152 is used to average the net load current over multiple coil frequency transitions. As such, it is a very low frequency filter.

If a back-emf current does flow back into the Load-leveling Boost Supply 120, the output voltage V2 increases, and the control circuit 130 detects that the voltage V2 is too high. When this occurs, the controller 130 controls the output by lowering the duty cycle of switch SW1. Blocking diode D2 is used with an additional capacitor C2 on the output of the circuit to "absorb" this reverse current. The extra current is stored in capacitor C2 and reused during the next cycle of the H-bridge 128. Note that the output voltage V2 must be able to increase over the entire Coil Frequency cycle. Therefore, the output voltage V2 is not a well-regulated voltage.

Now that the net load current a ($I_{LOAD}$) is determined, the control circuit 130 for the Load-leveling Boost Supply 120 forces the boost to stay on to supply the load current $I_{LOAD}$ that is needed. This is done by allowing the output voltage V2 to increase while the boost would normally be off, to thereby keep the input current constant. If the net load current is not used, and only the output current is monitored, the net energy stored in the system will keep increasing with each cycle, and the voltage will increase out of control.

Figure 4:
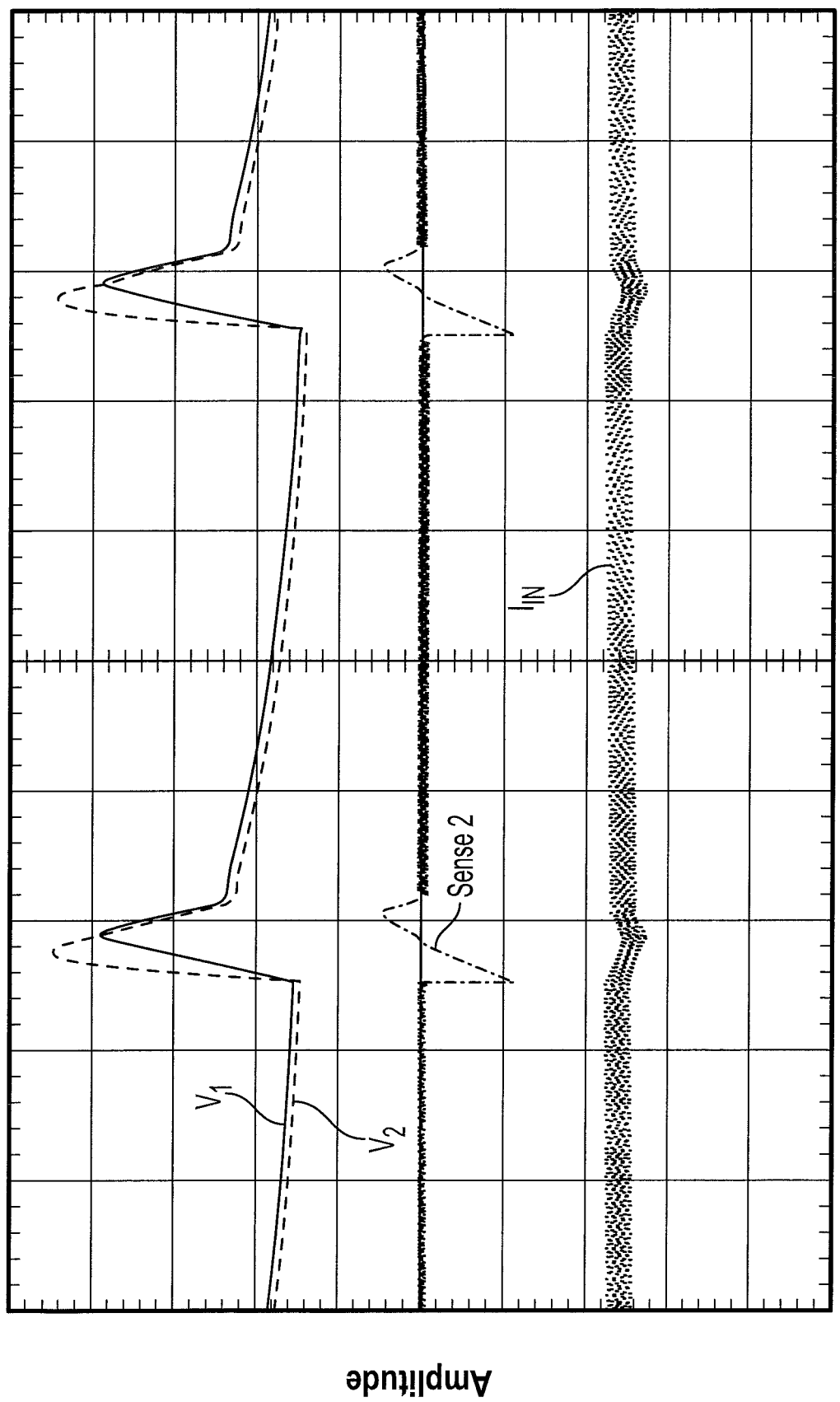
FIG. 4 is a graph of showing waveforms of a power supply of FIG. 1.

FIG. 4 is a graph showing amplitude of $V_1$, $V_2$, Sense 2 and $I_{IN}$ versus time for the circuit shown in FIG. 2 and illustrates the operation of the controller 130 as discussed above. The input current of the boost from the supply source $V_{in}$ varies indirectly with the supply voltage given a constant output load. When the Switch SW1 126 turns on, it causes current to flow through the inductor L1. This current causes energy to be stored in the inductor L1. The time that the inductor L1 and SW1 126 are on is known as the on-time, and the remainder of the switching cycle is referred to as the off-time. Diode D1 is reversed biased, and therefore does not conduct. During the off-time, diode D1 is forward biased and the energy stored in the inductor L1 is allowed to flow to the output and charge capacitor C1. The average of this current through D1 is the Boost Supply's load current (Current Sense 1). The load current is independent of the input supply voltage Vin. By sensing the load current (Current Sense 2) and forcing the net current to be the same as the load current sensed at Current Sense 1, the current in to the supply ($I_{in}$) will be continuous and nearly constant as shown in FIG. 4.

With this configuration, the input $I_{IN}$ current is actively controlled to reduce or eliminate large, periodic current surges which can range from zero (0) Amps input, to many Amps input in a matter of milliseconds. This can be considered a DC Power Factor Correction circuit.

Although the present invention has been described with reference to preferred embodiments, workers skilled in the art will recognize that changes may be made in form and detail without departing from the spirit and scope of the invention. In the configuration shown herein, capacitor $C_2$ provides power scavenging circuitry to store power from a coil when a direction of a drive current is reversed. However, other power storage and scavenging techniques can be used including those which is an inductor or a battery. With the configuration set forth herein, a boost power supply is provided by inductor L1, diode D1, switch SW1 and capacitor C1. A time average of the load current is provided using low pass filter 152. The output current from the boost supply is also sensed and applied to a low pass filter 150 which has a shorter time constant than low pass filter 152. The controller 130 compares these two filtered signals and controls operation of the switch SW1 to maintain the input current $I_{IN}$ at a relatively constant level as illustrated in FIG. 4.

What is claimed is:

1. A magnetic flowmeter for measuring a fluid flow, comprising:
   a flow tube assembly receiving the fluid flow and having a coil with first and second coil wires for receiving a coil current and responsively producing a magnetic field thereby generating an EMF in the fluid representative of a flow rate;
   an EMF sensor arranged to sense the EMF and generate an output indicating the flow rate;
   H-bridge circuitry configured to apply a current supply signal to the coil and switch a direction of the current supply signal flowing through the coil;
   a load leveling boost supply configured to provide power to the H-bridge circuitry and condition an input current from a DC source, the load-leveling boost supply comprising:
   an inductor coupled in series with the input current;
   a switch arranged to selectively connect the inductor to electrical ground and thereby boost a voltage provided by the DC source;
   current sense circuitry arranged to measure a net current flowing into and out of the coil; and
   a controller which controls operation of the switch based upon the measured net current such that input current is nearly constant.

2. The magnetic flowmeter of claim 1 wherein the supply-bridge circuitry includes first and second switches which couple the first and second coil wires respectively to a first supply conductor, and third and fourth switches which couple the first and second coil wires respectively to a second supply conductor.

3. The magnetic flowmeter of claim 1 wherein the load leveling boost supply includes a power storage element configured to scavenge power from the coil when a direction of the current supply signal through the coil is reversed.

4. The magnetic flowmeter of claim 3 wherein the power storage element comprises a capacitor.

5. The magnetic flowmeter of claim 1 wherein the load leveling boost supply includes a current sensor configured to sense current flowing into the coil and responsively control the current supply signal based upon the sensed current.

6. The magnetic flowmeter of claim 1 wherein the load leveling boost supply includes a current sensor configured to sense current flowing out of the coil and responsively control the current supply signal based upon the sensed current.

7. The magnetic flowmeter of claim 1 wherein the load leveling boost supply senses a voltage related to a voltage across the coil and responsively controls the current supply signal based upon the sensed voltage.

8. The magnetic flowmeter of claim 1 wherein the load leveling boost supply includes a diode to prevent current from the coil from flowing into components of the load leveling boost supply when a direction of the current supply signal applied to the coil is reversed.

9. The magnetic flowmeter of claim 1 wherein the load leveling boost supply includes a voltage sensor to sense a back EMF flowing from the coil into the load leveling boost supply due to a reversal in a direction of the current supply signal flowing through the coil.

10. The magnetic flowmeter of claim 9 wherein the controller controls the switch as a function of the sensed back EMF from the coil.

11. A magnetic flowmeter for measuring a fluid flow, comprising:
   a flow tube assembly receiving the flow having a coil with first and second coil wires for receiving a coil current and responsively producing a magnetic field thereby generating an EMF in the fluid representative of a flow rate;
   an EMF sensor arranged to sense the EMF and generate an output indicating the flow rate;
   H-bridge circuitry configured to apply a current supply signal to the coil and responsively reverse a direction of the current supply signal through the coil generating a back EMF causing a back EMF current to flow out of the coil; and
   power scavenging circuitry configured to recover power from the coil by charging a capacitor with the back EMF current.

12. The magnetic flowmeter of claim 11 including load leveling boost supply having a current sensor configured to sense current flowing into the coil and responsively control the current supply signal based upon the sensed current.

13. The magnetic flowmeter of claim 11 including load leveling boost supply having a current sensor configured to sense current flowing out of the coil and responsively control the current supply signal based upon the sensed current.

14. The magnetic flowmeter of claim 11 wherein the load leveling boost supply includes a switch configured to shut off the current supply signal as a function of the sensed back EMF.

* * * * *